(12) United States Patent
Suzuki et al.

(10) Patent No.: US 7,889,381 B2
(45) Date of Patent: Feb. 15, 2011

(54) PHOTO SERVICE SYSTEM

(75) Inventors: Ryo Suzuki, Tokyo (JP); Ayumu Isomura, Tokyo (JP); Nobumitsu Kurashima, Nagoya (JP)

(73) Assignee: Fujifilm Corporation, Tokyo (JP)

( * ) Notice: Subject to any disclaimer, the term of this patent is extended or adjusted under 35 U.S.C. 154(b) by 1665 days.

(21) Appl. No.: 11/137,328

(22) Filed: May 26, 2005

(65) Prior Publication Data

US 2005/0271257 A1 Dec. 8, 2005

(30) Foreign Application Priority Data

May 28, 2004 (JP) ............................. 2004-159330
May 31, 2004 (JP) ............................. 2004-161324

(51) Int. Cl.
*G06K 15/00* (2006.01)
*G06K 9/00* (2006.01)

(52) U.S. Cl. .................... 358/1.18; 358/1.16; 358/450; 358/540; 382/118; 382/284

(58) Field of Classification Search ................ 358/450, 358/462, 540; 382/115–118, 171, 173–180, 382/100, 103, 282, 283, 284; 345/234, 629; 348/239, 584

See application file for complete search history.

(56) References Cited

U.S. PATENT DOCUMENTS

| | | | | |
|---|---|---|---|---|
| 5,469,536 A * | 11/1995 | Blank | ........................ | 345/594 |
| 5,778,164 A * | 7/1998 | Watkins et al. | ............. | 358/1.18 |
| 6,024,288 A * | 2/2000 | Gottlich et al. | ............. | 235/493 |
| 6,184,926 B1 * | 2/2001 | Khosravi et al. | ............ | 348/239 |
| 6,222,637 B1 * | 4/2001 | Ito et al. | ................... | 358/1.18 |
| 6,526,158 B1 * | 2/2003 | Goldberg | ................... | 382/115 |
| 6,539,420 B1 * | 3/2003 | Fields et al. | ................ | 709/206 |
| 7,120,278 B2 * | 10/2006 | Sukegawa et al. | .......... | 382/118 |
| 7,239,725 B2 * | 7/2007 | Dobashi | .................... | 382/118 |

(Continued)

FOREIGN PATENT DOCUMENTS

JP 10-222649 A 8/1998

(Continued)

*Primary Examiner*—Twyler L Haskins
*Assistant Examiner*—Dennis Dicker
(74) *Attorney, Agent, or Firm*—Birch, Stewart, Kolasch & Birch, LLP

(57) ABSTRACT

A photo service system according to the present invention is provided with: a first storage control device which stores unique visitor identification information stored in an IC chip of an admission ticket equipped with IC chip and a registered face image, a face image of a visitor who holds the admission ticket equipped with IC chip, in association with each other, in a first storage medium; an extraction device which extracts, from an original image taken with a visitor as an object, an extracted face image indicating a face portion of the visitor; a second storage control device which identifies a registered face image matching the extracted face image from the first storage medium, and stores visitor identification information corresponding to the identified registered face image and an extracted face image matching the identified registered face image in association with each other, in a second storage medium; a reading device which reads unique visitor identification information from the admission ticket equipped with IC chip; a composite device which creates a composite image in which an extracted face image corresponding to the visitor identification information read from the admission ticket equipped with IC chip and a predetermined template image are superimposed; and a printing device which prints the composite image.

13 Claims, 14 Drawing Sheets

U.S. PATENT DOCUMENTS

| | | |
|---|---|---|
| 7,283,650 B1 * | 10/2007 | Sharma et al. ............... 382/118 |
| 7,362,919 B2 * | 4/2008 | Das et al. .................... 382/284 |
| 7,454,041 B2 * | 11/2008 | Sukegawa et al. ........... 382/118 |
| 7,486,808 B2 * | 2/2009 | Yonaha ....................... 382/118 |
| 7,551,755 B1 * | 6/2009 | Steinberg et al. ............ 382/118 |
| 7,634,106 B2 * | 12/2009 | Mino et al. .................. 382/103 |
| 2003/0164878 A1 * | 9/2003 | Iizaka ........................ 348/169 |
| 2004/0120009 A1 * | 6/2004 | White et al. ................ 358/1.18 |
| 2005/0221857 A1 * | 10/2005 | Miyashita et al. ........... 455/557 |

FOREIGN PATENT DOCUMENTS

| | | |
|---|---|---|
| JP | 10-282571 A | 10/1998 |
| JP | 2001209802 A | 8/2001 |
| JP | 2002027313 A | 1/2002 |
| JP | 2003-060881 | 2/2003 |
| JP | 2003-308527 A | 10/2003 |

* cited by examiner

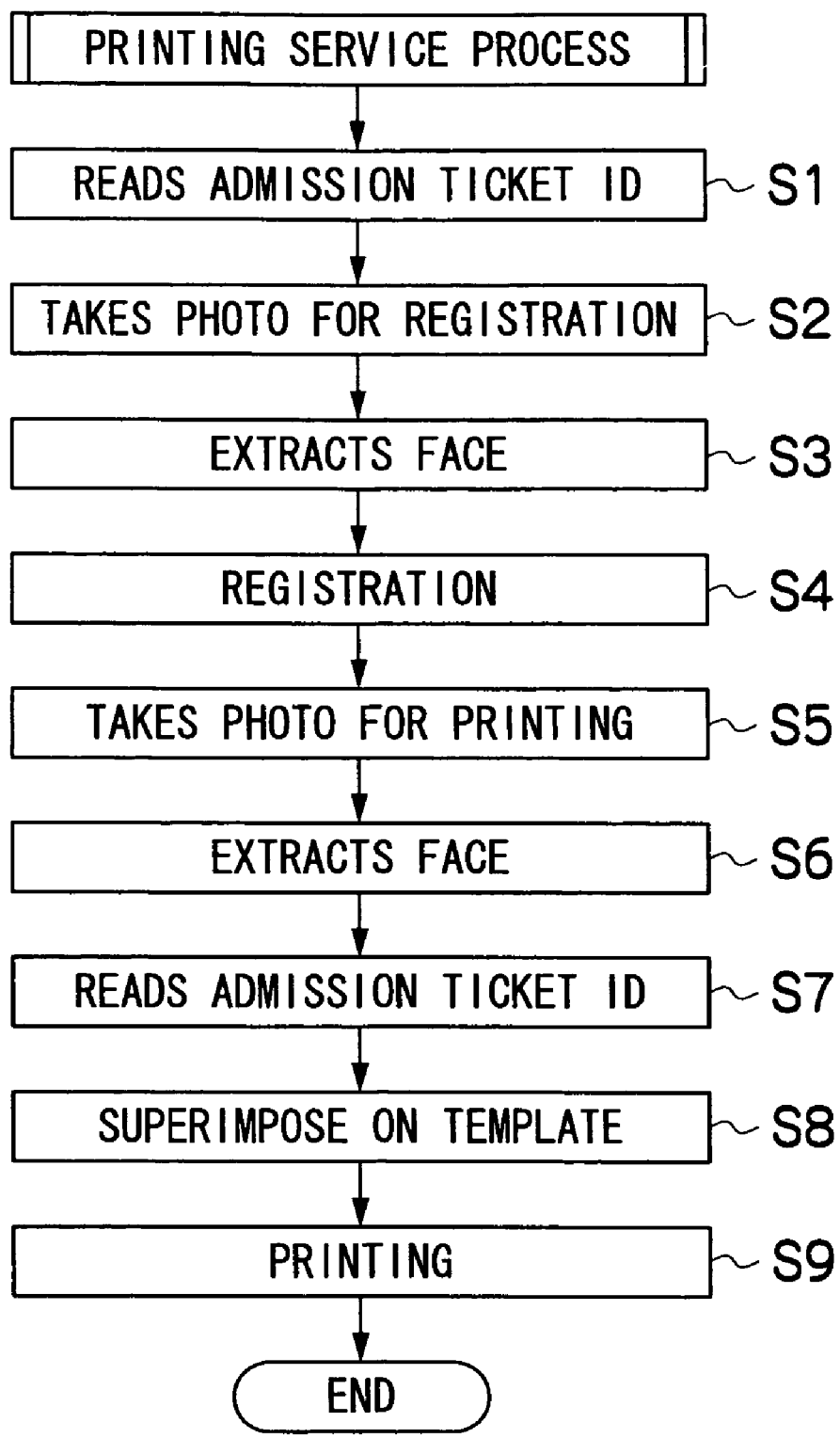

FIG.3A

USER DB

| ADMISSION TICKET ID | REGISTERED FACE IMAGE |
|---|---|
| 0001 | image1.jpg |
| 0002 | image2.jpg |
| 0003 | image3.jpg |
| ...... | ...... |

FIG.3B

IMAGE DB

| ADMISSION TICKET ID | EXTRACTED FACE IMAGE | ORIGINAL IMAGE | COMPOSITE IMAGE |
|---|---|---|---|
| 0001 | image1.jpg | I1.jpg | I1'.jpg |
| 0002 | image2.jpg | | |
| 0003 | image3.jpg | | |
| ...... | ...... | ...... | ...... |

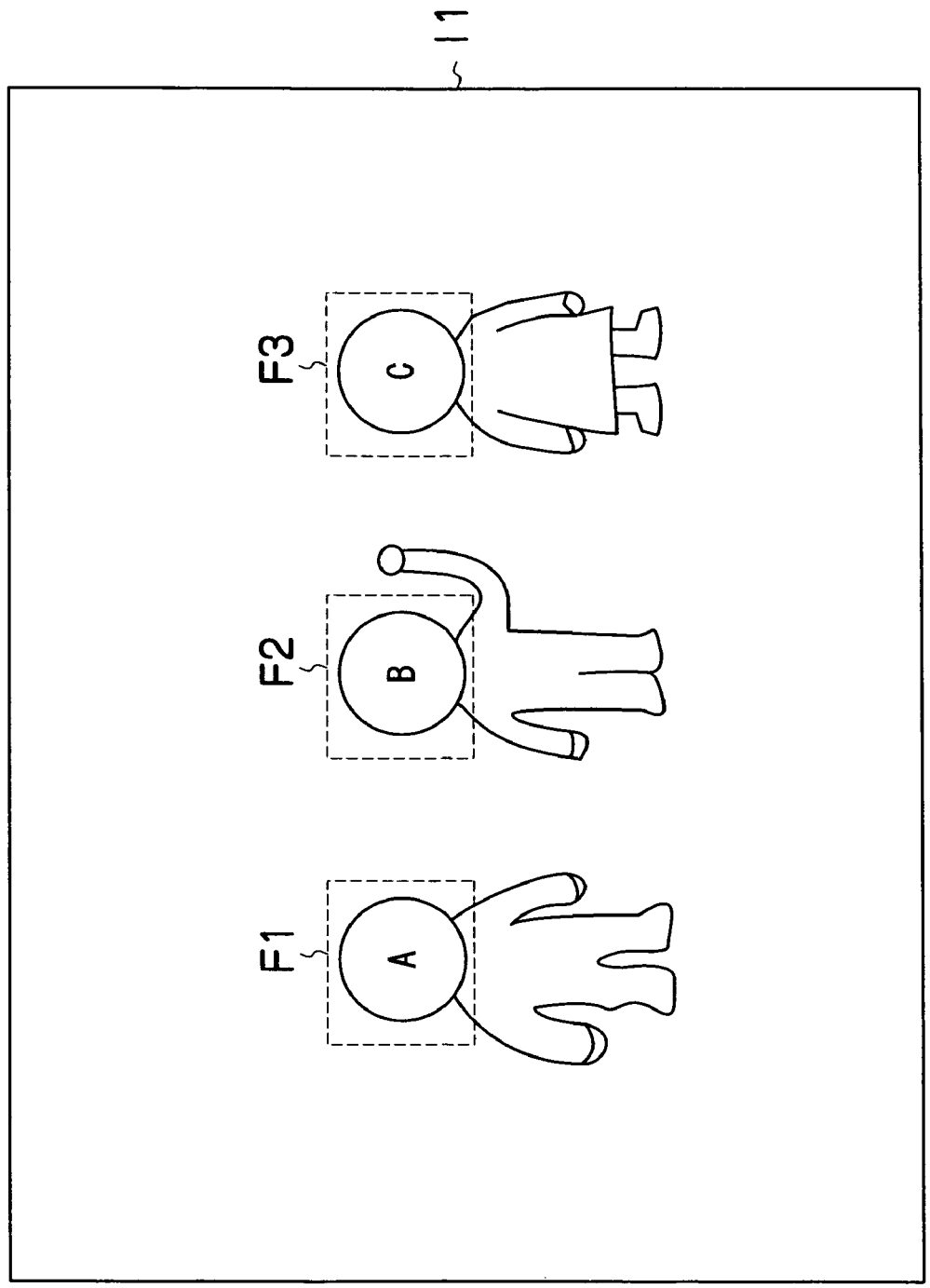

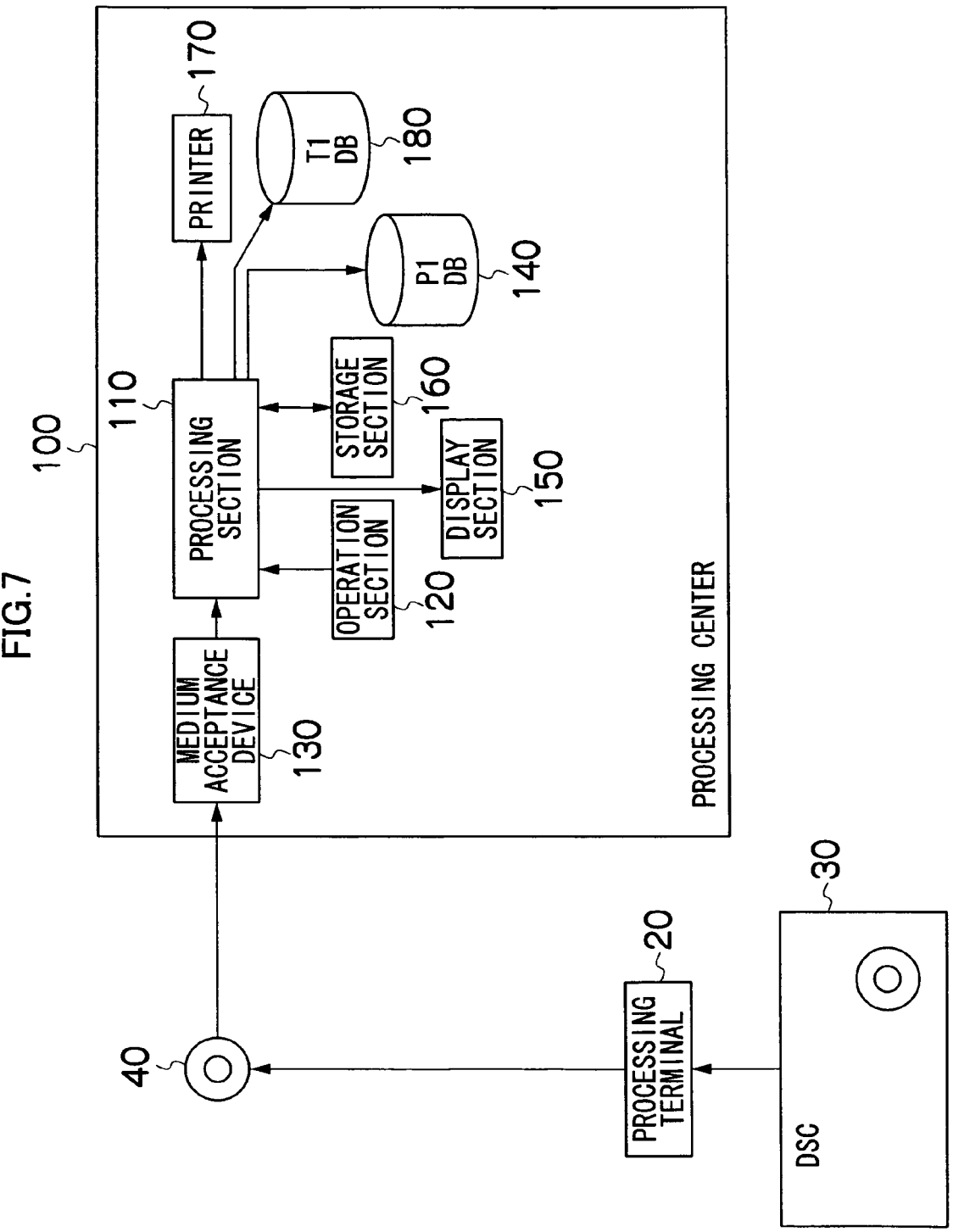

FIG.8A

| GROUP ATTRIBUTES | | TEMPLATE IMAGE |
|---|---|---|
| THE NUMBER OF MEMBERS | KIND | |
| ~5 | ASSOCIATION FOR THE AGED | T11. jpg |
| 35~50 | COMPANY TRIP | T12. jpg |
| ⋮ | ⋮ | ⋮ |

FIG.8B

| TEMPLATE IMAGE | COMPOSITE POSITION | FACE IMAGE ATTRIBUTES |
|---|---|---|
| T11. jpg | P1 | FEMALE, FULL-FACE |
| | P2 | FEMALE, FULL-FACE |
| | P3 | FEMALE, SOMEWHAT RIGHT DIRECTION |
| | P4 | MALE, FULL-FACE, SMILING |
| | P5 | MALE, FULL-FACE |
| ⋯⋯ | | ⋯⋯ |

FIG.12

| TEMPLATE IMAGE | COMPOSITE POSITION | FACE IMAGE |
|---|---|---|
| TI1.jpg | P1 | F1.jpg |
| | P2 | F2.jpg |
| | P3 | F3.jpg |
| | P4 | F4.jpg |
| | P5 | F5.jpg |

PHOTO SERVICE SYSTEM

BACKGROUND OF THE INVENTION

1. Field of the Invention

The present invention relates to a photo service system in which an image taken at a prescribed position in a facility is superimposed on a predetermined template image and printed, and a photo service system in which an image taken as a group photo is superimposed on a predetermined template image and printed.

2. Description of the Related Art

There have been proposed various systems for printing an interesting composite photo. For example, according to Japanese Patent Application Laid Open No. 10-282571, a frame image to be displayed on a monitor screen before taking a photo is displayed is displayed as animation, and a static image of the frame image acquired when a stop button is pressed down is set as a frame image to be used for the photo taking. As a result, even when a frame image of the same image pattern is used for photo taking, a photo in a different mood is obtained by changing the timing of pressing down the stop button.

There have also been proposed various systems for printing a useful composite image obtained from an original image. For example, an image composite apparatus of Japanese Patent Application Laid Open No. 10-222649 generates composite information required for superimpose automatically or by specifying points, using a face image, a clothes image and a neck image taken from forward and a background image as input, converts the size and colors of the face image, the clothes image, the neck image and the background image in accordance with the content of the composite information, and superimposes the converted face image, clothes image, neck image and background image to generate a portrait image which does not give an unnatural feeling.

SUMMARY OF THE INVENTION

According to Japanese Patent Application Laid Open No. 10-282571, a profile of one player is photographed and the profile image is superimposed on a frame image. However, a technique for identifying profile images of a lot of players is not specifically disclosed.

In Japanese Patent Application Laid Open No. 10-222649, there is not disclosed a specific technique for superimposing a face image of each individual persons in a group photo with a suitable background image.

The present invention has been made in consideration of the above problems, and its object is to provide a photo service system capable of identifying and printing an image obtained by superimposing a face image among face images of a lot of users taken in a facility such as a theme park with a template image.

Another object of the present invention is to provide a photo service system capable of superimposing face images of persons in a group photo with a suitable template image and printing the composite image.

In order to solve the above problems, a photo service system according to the present invention is provided with: a first storage control device which stores unique visitor identification information stored in an IC chip of an admission ticket equipped with IC chip and a registered face image, a face image of a visitor who holds the admission ticket equipped with IC chip, in association with each other, in a first storage medium; an extraction device which extracts, from an original image taken with a visitor as an object, an extracted face image indicating a face portion of the visitor; a second storage control device which identifies a registered face image matching the extracted face image from the first storage medium, and stores visitor identification information corresponding to the identified registered face image and an extracted face image matching the identified registered face image in association with each other, in a second storage medium; a reading device which reads unique visitor identification information from the admission ticket equipped with IC chip; a composite device which creates a composite image in which an extracted face image corresponding to the visitor identification information read from the admission ticket equipped with IC chip and a predetermined template image are superimposed; and a printing device which prints the composite image.

According to this invention, a composite image is printed in which an extracted face image corresponding to visitor identification information read from an admission ticket equipped with IC chip and a predetermined template image are superimposed. Thus, a visitor can easily identify a composite image including his own face image by means of the admission ticket equipped with IC chip he holds and order a print of the image.

Preferably, this photo service system further comprises a determination device which determines composite positions, positions where one or multiple extracted face images extracted from one original image are superimposed on the template image, and the composite device superimposes the extracted face images at the determined composite positions.

According to this invention, composite positions where one or more extracted face images are to be superimposed are determined. The composite positions may be arbitrarily determined. For example, it is possible to accept specification of a position where each extracted face image is to be superimposed from an operation device such as a keyboard and a mouse, and set the specified position as a composite position.

Preferably, the determination device determines a composite position of an extracted face image corresponding to the visitor identification information read from the admission ticket equipped with IC chip to be a particular first composite position, and a composite position of an extracted face image not corresponding to the visitor identification information read from the admission ticket equipped with IC chip to be a second composite position other than the first composite position.

According to this invention, a composite position of an extracted face image corresponding to a visitor identification information read from an admission ticket equipped with IC chip is determined as a first composite position. For example, by setting the center of a template image, where an extracted face image placed there stands out, as the particular first composite position, the extracted face image corresponding to visitor identification information read by an admission ticket equipped with IC chip is arranged in a composite image at a best position where the image stands out. This provides a motivation for a particular visitor to have his admission ticket equipped with IC chip read as one of print order operations, and his satisfaction to obtain a print is enhanced.

In order to solve the above problems, a photo service system according to the present invention comprises: an extraction device which extracts a face image of each person from a taken image of a group in which faces of multiple persons are included; a composite device which creates a composite image in which the extracted face images and a template image corresponding to attributes of the group are superimposed; and a printing device which prints the composite image.

According to this invention, a composite image is created in which face images and a template image corresponding to group attributes (such as the number of group members and the kind of the group) are superimposed, and thereby, it is possible to provide an interesting print from a taken group image, based on group attributes.

Preferably, this photo service system further comprises a storage device which stores group attributes and a template image in association with each other, and a template image identification device which identifies group attributes from a taken group image and identifies a template image corresponding to the identified group attributes from the storage device, and the composite device creates a composite image in which the face images and the identified template image are superimposed.

According to this invention, the storage device stores group attributes and a template image in association with each other; the template image identification device identifies group attributes and identifies a template image corresponding to the identified group attributes from the storage device; and the composite device creates a composite image in which face images and the template image are superimposed. That is, by properly storing group attributes and a template image in association with each other in advance, it is possible to create a composite image appropriate for a group.

Preferably, this photo service system further comprises a composite position determination device which determines composite positions, positions where the face images and the template image are superimposed, based on attributes of the face images, and the composite device superimposes the face images at the determined composite positions.

According to this invention, it is possible to superimpose a face image at a suitable position on a template image based on its attributes (such as the direction of the face, sex and facial expression).

Preferably, this photo service system further comprises an acquisition device which acquires identification information about the group, and the printing device prints the acquired group identification information together with the composite image.

According to this invention, group identification information is recognized from the group identification information displayed as an object in a taken group image. Alternatively, the group identification information may be acquired by having it inputted from a keyboard or the like. Then, the acquired group identification information is printed out together with a composite image. Thus, it is possible to identify, from the group identification information, from which the group's face images the printed composite image has been created.

Preferably, the printing device prints the group identification information on the back side of a printing surface of the composite image.

By printing group identification information on the back side of a printing surface of a composite image, it will not make an obstruction in viewing the composite image.

According to this invention, a composite image is printed in which extracted face images corresponding to visitor identification information read from an admission ticket equipped with IC chip and a predetermined template image are superimposed. Thus, a visitor can easily identify a composite image including his own face image by means of an admission ticket equipped with IC chip he holds and orders a print of the image.

Furthermore, according to this invention, a composite image is created in which face images and a template image corresponding to group attributes (such as the number of group members and the kind of the group) are superimposed, and thereby, it is possible to provide an interesting print from a taken group image, based on group attributes.

BRIEF DESCRIPTION OF THE DRAWINGS

FIG. 2 is a flowchart showing the flow of a process performed by this system;

FIG. 3A is conceptual illustration of information to be stored in a user DB;

FIG. 3B is conceptual illustration of information to be stored in an image DB;

FIG. 4 shows an example of an original image and extracted face images;

FIG. 7 is a block diagram of a photo service system according to a second embodiment;

FIG. 8A is conceptual illustration of information to be stored in a template image data base;

FIG. 8B is conceptual illustration of information to be stored in a template image data base;

FIG. 12 is conceptual illustration of information to be stored in a print image database;

DETAILED DESCRIPTION OF THE PREFERRED EMBODIMENTS

Preferred embodiments of the present invention will be described below with reference to accompanying drawings.

First Embodiment

Figure 1:
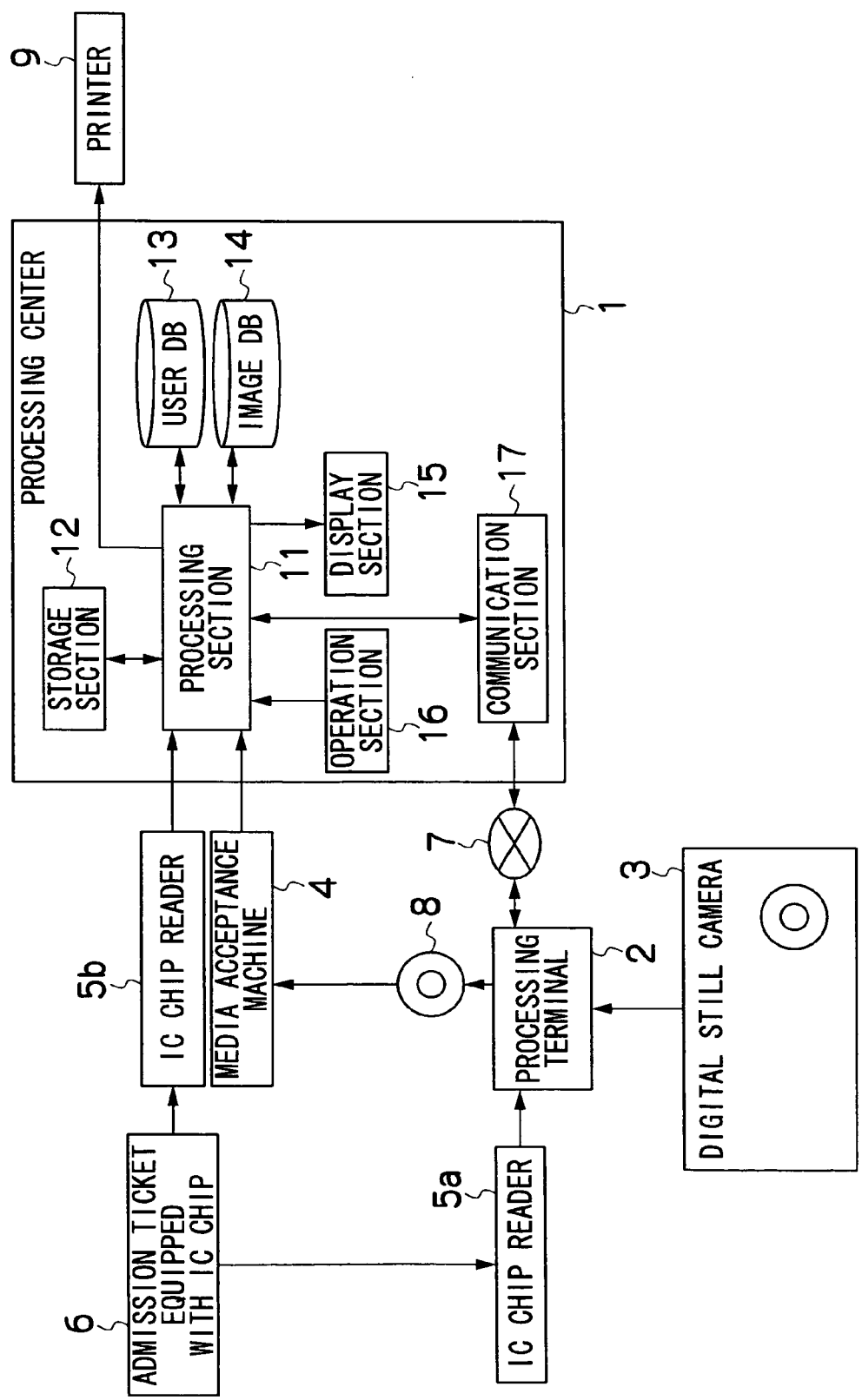
FIG. 1 is a block diagram of a photo service system according to a preferred embodiment of the present invention.

FIG. 1 is a block diagram of a photo service system according to a preferred embodiment of the present invention. This system is to be used in a facility such as a theme park. This system includes a processing center 1 configured by a personal computer server or the like installed at a prescribed place in the facility, and a processing terminal 2 configured by a personal computer or the like installed at a spot for photographing (photo spot) in each of various places in the facility. The processing terminal 2 and the processing center 1 are connected with each other via a network 7 such as a LAN. Though this figure shows only one processing terminal 2, it is also possible to connect multiple processing terminals 2 to the processing center 1. To the processing terminal 2 and the processing center 1, there are connected IC chip readers 5a and 5b, respectively, for reading a unique admission ticket ID stored in the IC chip (not shown) of an admission ticket 6 equipped with IC chip distributed to a visitor to the facility.

The processing center 1 has a processing section 11 configured by a central processing unit (CPU) or the like, a communication section 17 which performs data communication via the network 7 such as the Internet, an IC chip reader 5 which reads a unique admission ticket ID stored in the admission ticket 6 equipped with IC chip, an operation section 16 which accepts various input operations and instruction operations, a user database (DB) 13 in which information for managing visitors are stored, an image database (DB) 14 in which images sent from the processing terminal 2 are managed, a display section 15 which is a display to provide various displays, and a storage section 12 configured by a semiconductor storage device or the like in which various data and programs used and executed by the processing section 11 are stored. The processing terminal 2 is connected to a digital still camera (DSC) 3 via a communication line in compliance with IEEE1394 or the like.

The usage and the process flow of the printing service of this system will be described below based on the flowchart in FIG. 2. At step S1, a unique admission ticket ID stored in the IC chip of an admission ticket 6 equipped with IC chip distributed to each visitor when the visitor enters a facility is read by the IC chip reader 5a. At step S2, a staff member takes a photo of each visitor's face individually with the DSC 3. At step S3, the processing terminal 2 extracts a face portion from the image sent from the DSC 3 and sends the extracted face portion image and the admission ticket ID read at step S1 in association with each other to the processing center 1. There are various face extraction processings which can be applied to the extraction of a face portion.

At step S4, the processing section 11 of the processing center 1 registers the received face portion image and admission ticket ID with the user DB 13 in association with each other. The face portion image registered with the user DB 13 is hereinafter referred to as a registered face image. FIG. 3A is conceptual illustration of information to be stored in the user DB 13. In the user DB 13, an admission ticket ID and a registered face image are stored in association with each other. That is, it is possible, in the user DB 13, to identify which registered face image is of which visitor from an admission ticket ID.

At step S5, a staff member arranged at each photo spot takes a photo of a visitor who wants to be photographed, with the DSC 3. It is also possible to take a photo of multiple visitors as a group. The image of a visitor taken at each photo spot is sent from the DSC 3 to the processing terminal 2. The processing terminal 2 sends this image to the processing center 1 via the network 7. At step S6, the processing section 11 of the processing center 1 extracts a face portion of an object (that is, a visitor) included in the image sent from the processing terminal 2 (hereinafter referred to as an original image). The image of the face portion extracted from the original image by the processing section 11 is hereinafter referred to as an extracted face image. For example, if there are three persons displayed in an original image I1 as shown in FIG. 4, the processing section 11 extracts three face portions F1 to F3 as extracted face images.

The processing section 11 then identifies a registered face image matching the extracted face image from the user DB 13, and stores an admission ticket ID corresponding to the identified registered face image, the extracted face image corresponding to the identified registered face image and an original image including the extracted face image in association with one another, with the image database (DB) 14. There are various face recognition techniques which can be applied to the determination of matching between a registered face image and an extracted face image. For example, the matching between them can be determined from the face size, the face outline, the positions of eyes and the like. FIG. 3B is conceptual illustration of information to be stored in the image DB 14. In the image DB 14, at least an admission ticket ID, an extracted face image and an original image including the extracted face image are stored in association with one another. That is, each visitor can identify an original image in which his own face is displayed, by means of the admission ticket ID of the admission ticket 6 equipped with IC chip he holds.

At step S7, a visitor who wants to obtain a print of an image taken at each photo spot has the admission ticket ID of an admission ticket 6 equipped with IC chip read by the IC chip reader 5b connected to the processing center 1, as one of print order operations. The processing section 11 identifies an original image corresponding to the admission ticket ID read by the IC chip reader 5b, from the image DB 14. At step S8, the processing section 11 superimposes an extracted face image corresponding to the identified original image with a predetermined template image, and displays it on the display section 15 as a preview image. Though the template image is not especially limited, it is preferable that the content which commemorates the visit to the facility (such as the name of the facility and a mascot character) is included.

Figure 5:
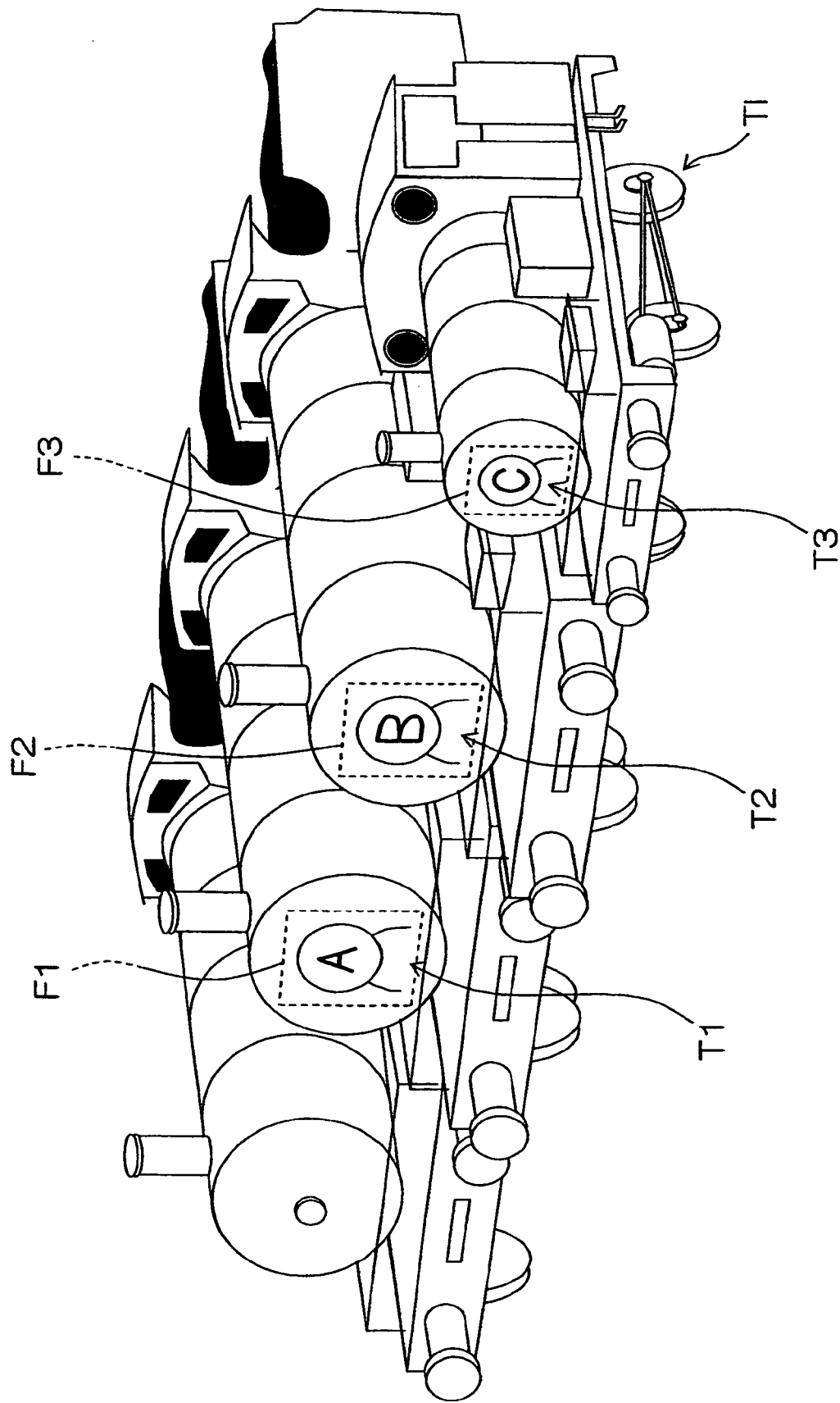
FIG. 5 shows an example of a composite image.
Figure 6:
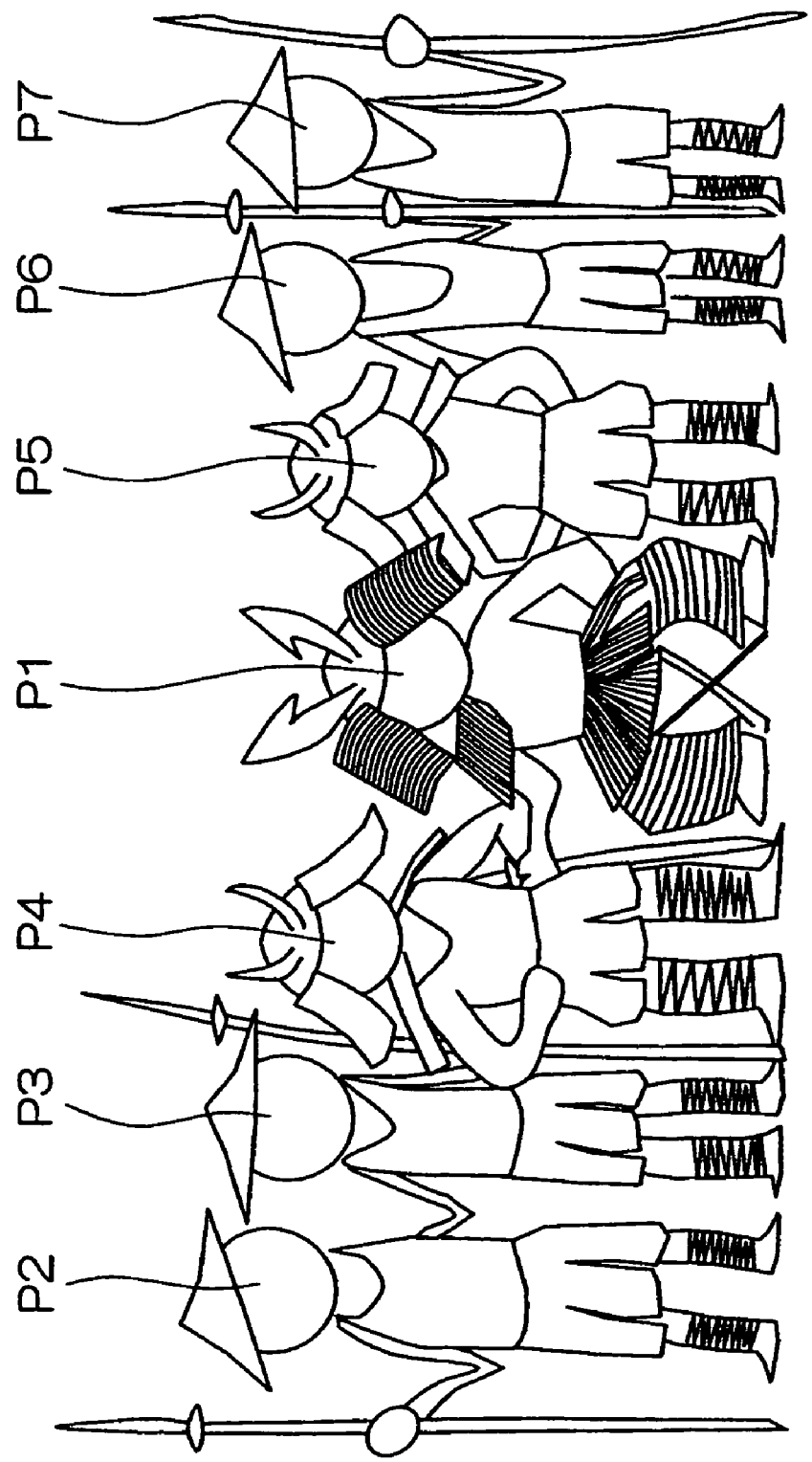
FIG. 6 shows an example of composite positions of extracted face images.

On the template image, there are prepared one or multiple positions where an extracted face image is to be superimposed. This position is hereinafter referred to as a composite position. If multiple visitors' faces are included in the original image, then there are multiple extracted face images corresponding to the original image, which are identified by the admission ticket ID. In this case, it may be arbitrarily specified by a visitor from the operation section 16 which extracted face image is to be superimposed at which composite position. Alternatively, the processing center 1 may determine which extracted face image is to be superimposed at which position in accordance with predetermined rules. For example, it is possible to superimpose an extracted face image corresponding to the admission ticket ID read by the IC chip reader 5b at a particular first position, such as a prominent position in the extracted face image (for example, a position P1 in FIG. 6), and an extracted face image which is not corresponding to the admission ticket ID read by the IC chip reader 5b at a composite position other than the first position (for example, any of positions P2 to P7 in FIG. 6). Thus, the positions where multiple extracted face images which have been extracted from one original image acquired by taking a group photo are superimposed change depending on which visitor has his admission ticket ID read by the IC chip reader 5, and thereby, a composite image is more interesting. At step S9, a printer 9 prints the original image and a composite image. FIG. 5 shows an example of the composite image. In this figure, extracted face images F1 to F3 have been superimposed at composite positions T1 to T3 of a template image T1, respectively. The extracted face image F2 of a visitor who has had the admission ticket ID read is arranged at the center of the image.

It is also possible to provide the processing terminal 2 with the user DB 13 and the image DB 14, cause the processing terminal 2 to perform the processings to be performed by the processing section 11 from among the above steps S3 to S8, instead of the processing section 11, record a composite image acquired by the processing terminal 2 on a recording medium 8, carries the recording medium 8 to the processing center 1, read the composite image recorded on the recording medium 8 by means of a medium acceptance device 4 and print the composite image by means of the printer 9.

Thus, by having the admission ticket ID of an admission ticket 6 equipped with IC chip read by the IC chip reader 5b connected to the processing center 1, each visitor can have an original image of himself taken at each photo spot and an image in which his extracted face image has been superimposed on a template printed from the printer 9. Since an extracted face image is superimposed on the template image, it is possible to obtain a print of an interesting image as taken with the use of a panel having holes for faces to be inserted provided at a sight-seeing place. At the same time, a print of an original image taken at each photo spot can be also obtained.

Second Embodiment

FIG. 7 is a block diagram of a photo service system according to a second preferred embodiment of the present invention. This system is to be used in a facility such as a theme park. This system includes a processing center 100 configured by a personal computer server or the like installed at a prescribed place in the facility, and a processing terminal 20 configured by a personal computer or the like installed at a photo spot in the facility. The processing terminal 20 is connected to a digital still camera (DSC) 30 via a communication line in compliance with IEEE1394 or the like, and a taken image is sent from the DSC 30. The processing terminal 20 stores the taken image which it has received on a recording medium 40 such as a DVD. The processing terminal 20 and the processing center 100 may be connected via a network such as a LAN.

The processing center 100 has a processing section 110 configured by a central processing unit (CPU) or the like, an operation section 120 which accepts various input operations and instruction operations, such as a keyboard and a pointing device, a medium acceptance device 130 which reads a taken image stored in the recording medium 40, a print image database (PIDB) 140 in which images to be printed are managed, a display section 150 which is a display to provide various displays, a storage section 160 configured by a semiconductor storage device or the like in which various data and programs used and executed by the processing section 110 are stored, a printer 170 which prints an image, and a template image database (TIDB) 180 in which template images to be superimposed on a taken image are managed.

Figure 11:
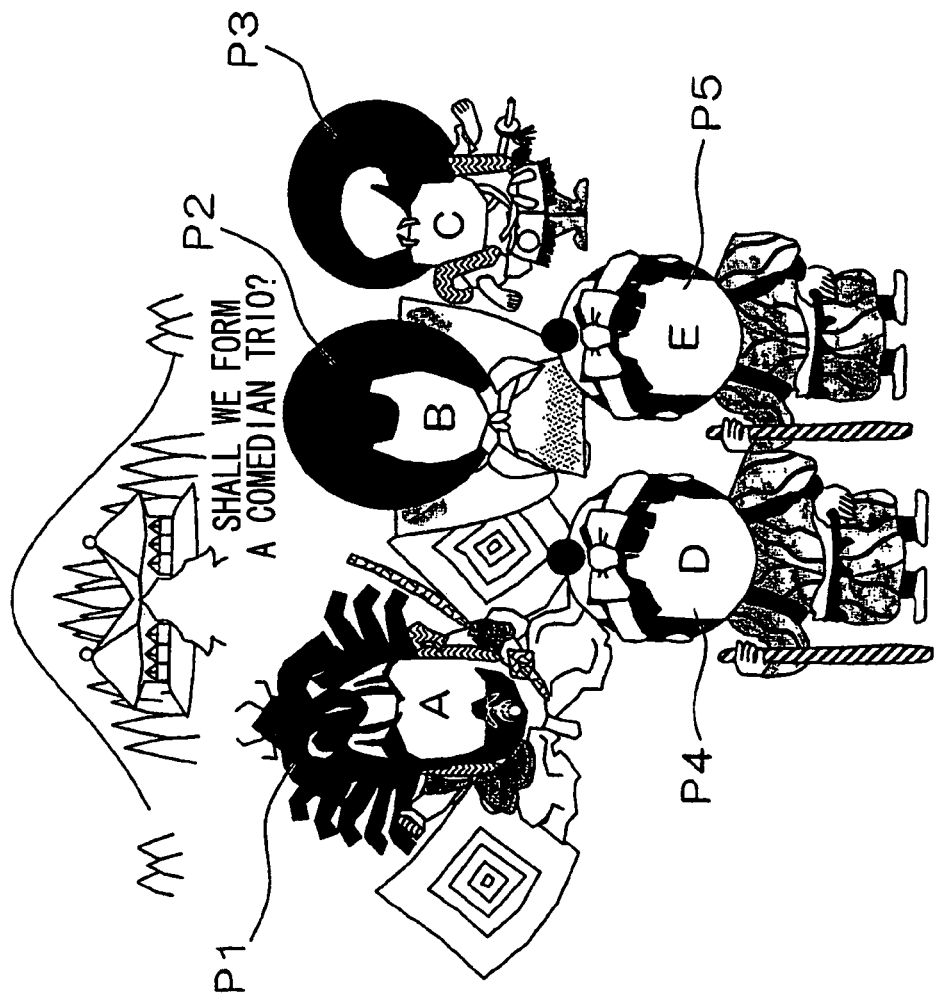
FIG. 11 shows an example of a template image.

FIG. 8 is conceptual illustration of information to be stored in the TIDB 180. As shown in FIG. 8A, in the TIDB 180, there is stored a group attributes table, in which group attributes and a template image are associated with each other. In this figure, the number of group members and the kind of the group (such as an association for the aged and a company trip) are shown as examples of group attributes. The content of the template image is set to be appropriate for the attributes of the corresponding group. For example, if the content of a template TI1.jpg is as shown in FIG. 11, face images of less than five persons are superimposed on the template image, and therefore the template corresponds to the number of group members of "less than 5". Furthermore, as in FIG. 8B, in the TIDB 180, there is stored a face image attributes table in which composite positions for multiple face images on each template image and face image attributes are associated with each other. The face image attributes are attributes to be identified from a face image extracted by the processing terminal 20, such as sex, a direction of a face and facial expression. A composite position is set to be appropriate for the attributes of a corresponding face image. For example, in the case of the template TI1.jpg in FIG. 8B, a face image attribute of "somewhat right direction" corresponds to a composite position P3. The content of information in the group attributes table and the face image attributes table may be changed by operating the operation section 120.

Figure 9:
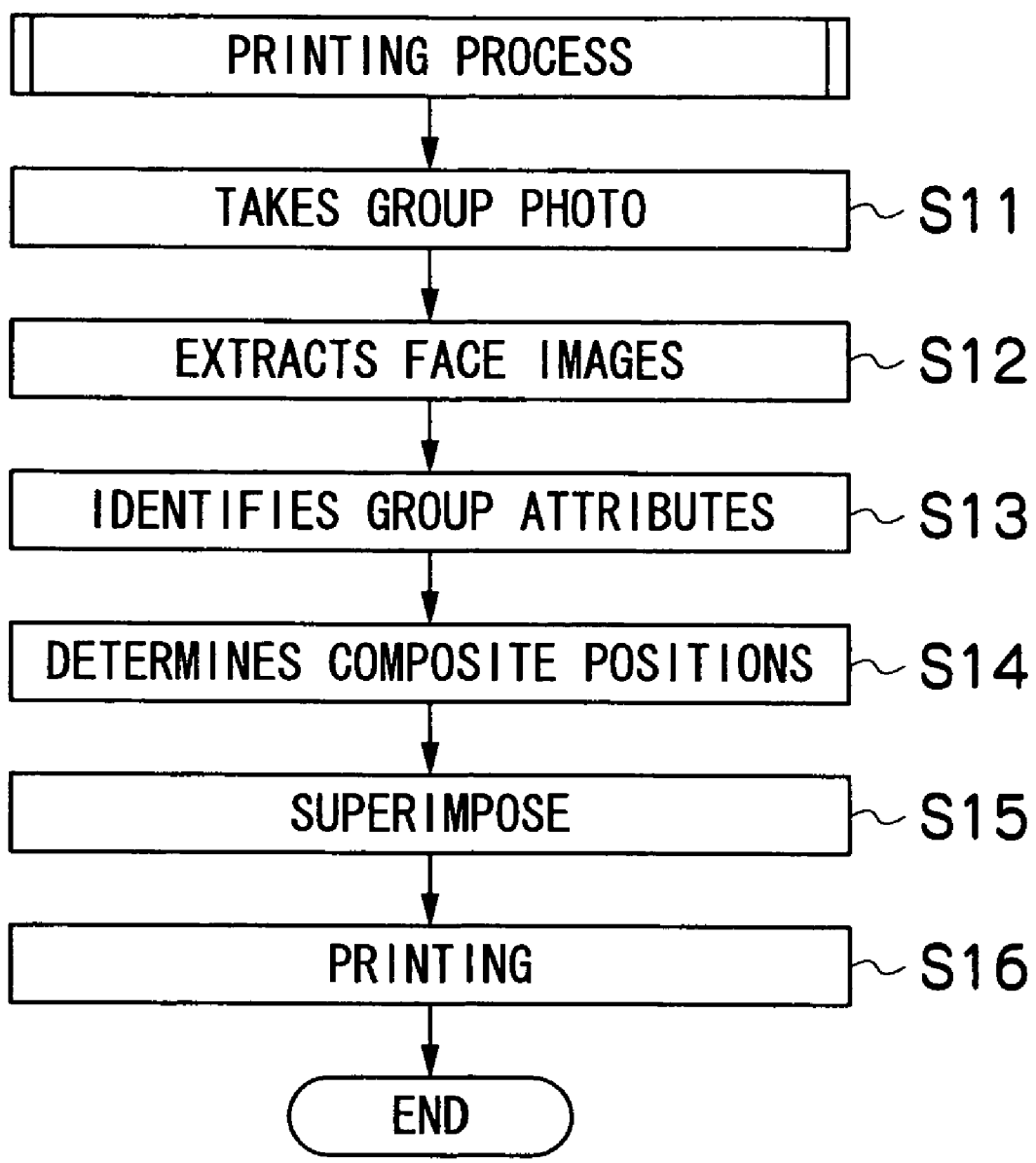
FIG. 9 is a flowchart showing the flow of a printing process.
Figure 10:
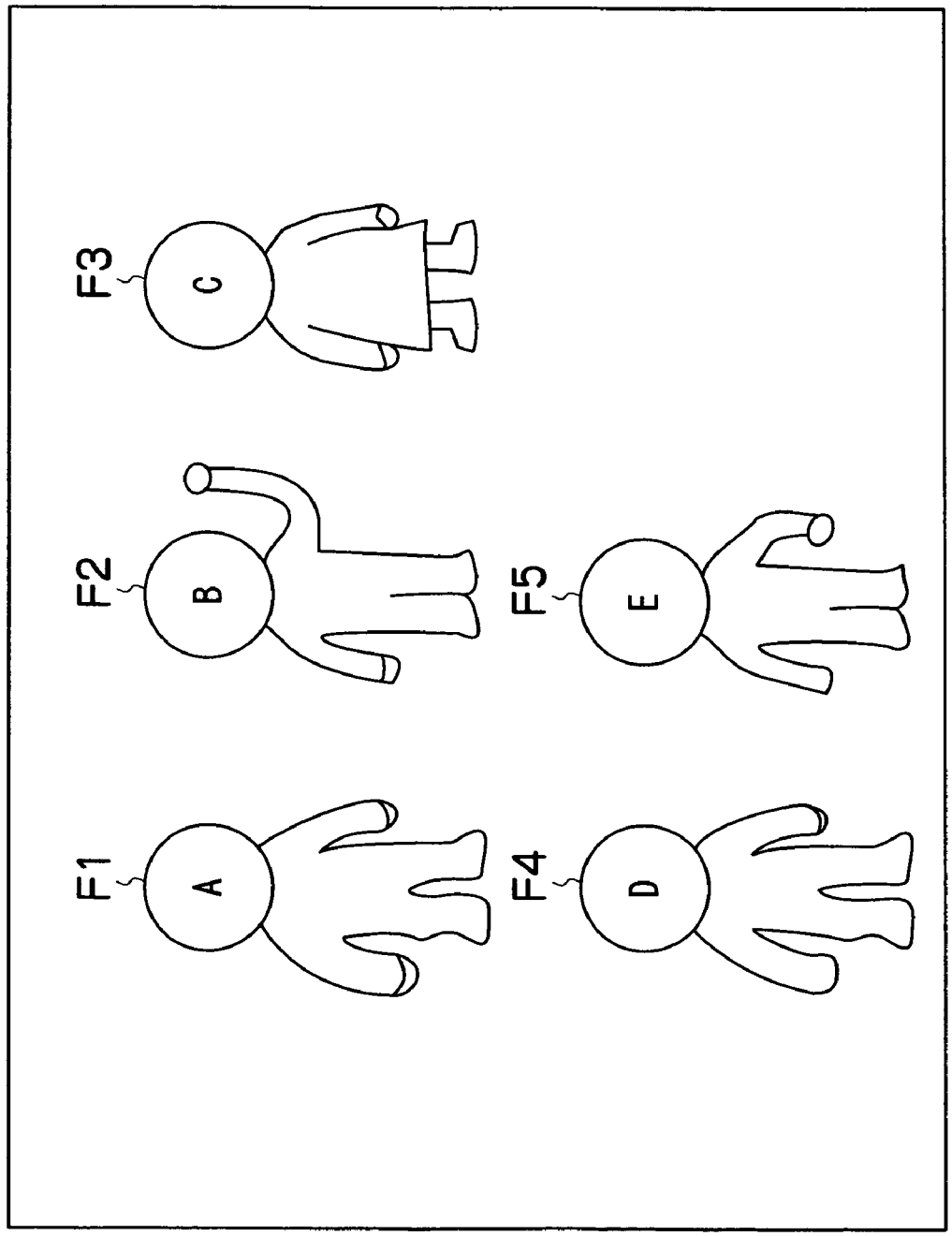
FIG. 10 shows an example of an image taken as a group photo.

The flow of a printing process of this system will be described below based on the flowchart shown in FIG. 9. At step S11, a staff member takes a photo of a group with the DSC 30. FIG. 10 shows an example of the taken group image. Though this figure shows a photo of a group which includes face images F1 to F5 of five persons A to E, the number of group members is not especially limited. The staff member may take this opportunity to take a normal group photo which is not to be superimposed on a template with a silver salt camera or the like. The DSC 30 sends the taken group image to the processing terminal 20. At step S12, the processing terminal 20 extracts face images from the taken group image. There are various applicable face image extraction techniques, including Japanese Patent Application Laid Open No. 2001-209802 (applicant: Fuji Photo Film Co., Ltd.), for example. The staff member visually checks whether or not the face images of all the group members have been extracted, on a display not shown of the processing terminal 20. If finding any person who has not been extracted, the staff member may take a group photo again. The extracted face images are recorded on the recording medium 40. The processing section 110 reads the face images from the recording medium 40 by means of the medium acceptance device 130 and stores them in the storage section 160.

At step S13, attributes of the group photographed by the staff member at step S11 are identified (specified) by operating the operation section 120. The processing section 110 stores a template image corresponding to the group attributes specified by the operation section 120 in the storage section 160. In stead of specifying all or a part of the group attributes by means of the operation section 120, all or a part of the group attributes may be identified from the taken group image. For example, the number of face images extracted from the taken group image may be set as the number of group members which is one of the group attributes. At step S14, the processing section 110 acquires face image attributes from each of the read face images, identifies a composite position corresponding to face image attributes matching the acquired face image attributes, from the face image attributes table, and stores composite image information in which each face image is associated with a composite position and a template image stored in the storage section 160 at step S13, in the PIDB 140. For example, if the attributes acquired from the face images F1 to F5 match the face images attributes corresponding to the composite positions P1 to P5, respectively in TIDB 180, then the face images F1 to F5 are stored in association with the composite positions P1 to P5 in PIDB 140, respectively, as shown in FIG. 12. There are various applicable face image attributes extraction techniques, and an example of a technique of recognizing facial expression is that disclosed in Japanese Patent Application Laid Open No. 2002-27313 (applicant: Fuji Photo Film Co., Ltd.).

At step S15, in accordance with the composite image information stored in the PIDB 140, the processing section 110 creates a composite image in which, at each composite position of the template image, a face image corresponding to the composite position is superimposed. At step S16, the printer 170 prints the composite image.

According to the above process, a template image suitable for group attributes such as the number of group members and face images are automatically superimposed. Accordingly, it is possible to provide an interesting print, such as a print with the use of a panel having holes for faces to be inserted, from a group photo, and thereby the added value of providing a print is increased. Furthermore, since the position on a template image where a face image is to be superimposed is determined based on the attributes of the face image, it is possible to arrange a face image at a suitable position on the template image based on the face image attributes.

Third Embodiment

Though it is assumed in the second embodiment to provide only a "composite photo" obtained by printing a composite image in which face images are superimposed on a template image, it is also assumable as a more enhanced service form to provide both of a group photo and a composite photo of the same group as a pair. As for an image to be printed as a group photo (hereinafter referred to as a group image for printing), it is preferable to use a silver salt camera and record the image on a silver salt camera film rather than using a digital still camera (DSC), in order to secure the finishing quality and minimize failure in printing. In this case, there may be caused a problem that which group photo is paired with which composite photo cannot be distinguished. Therefore, it is necessary to enable identification of a pair of a group photo and a composite photo.

Figure 13:
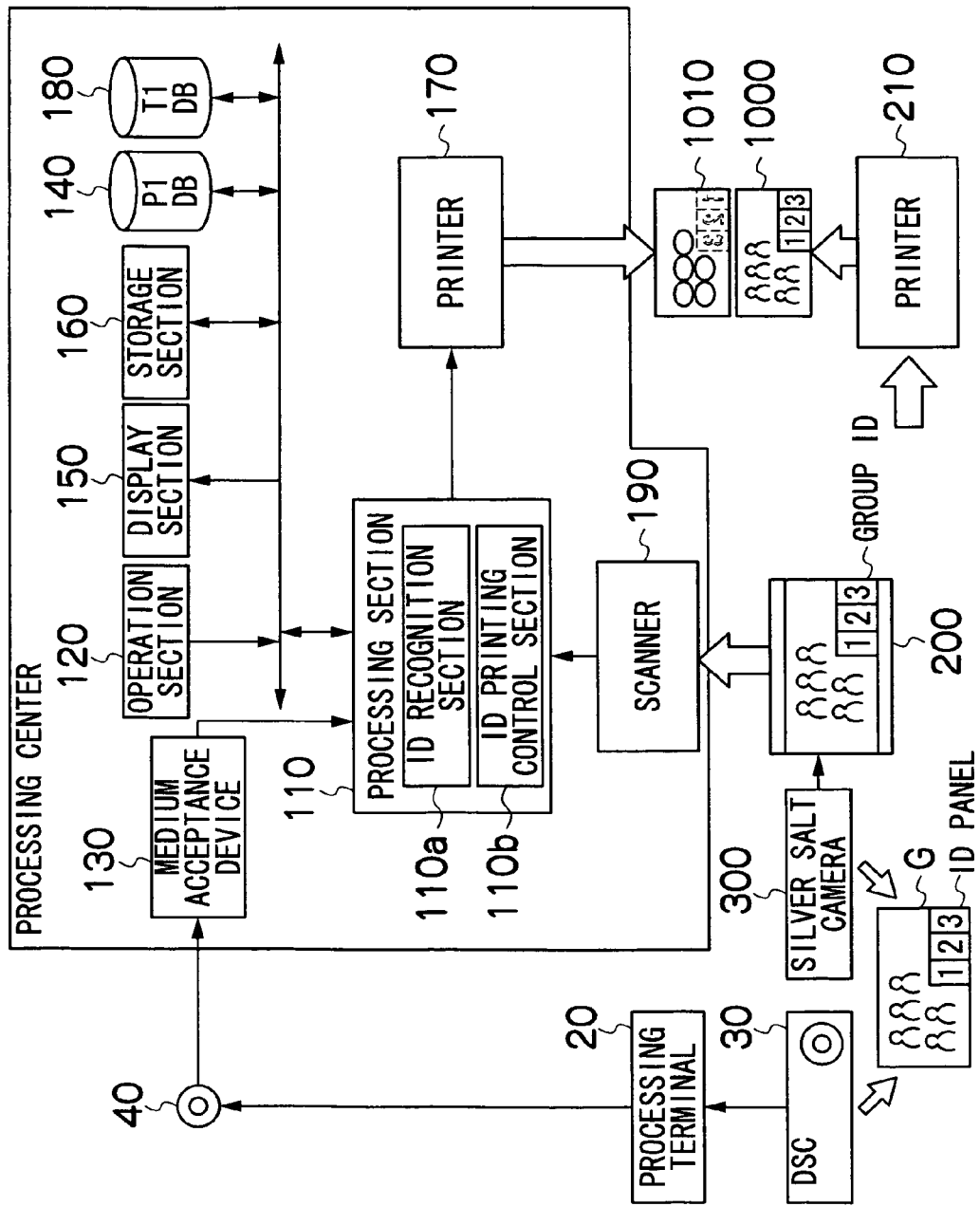
FIG. 13 is a block diagram of a photo service system according to a third embodiment.
Figure 14:
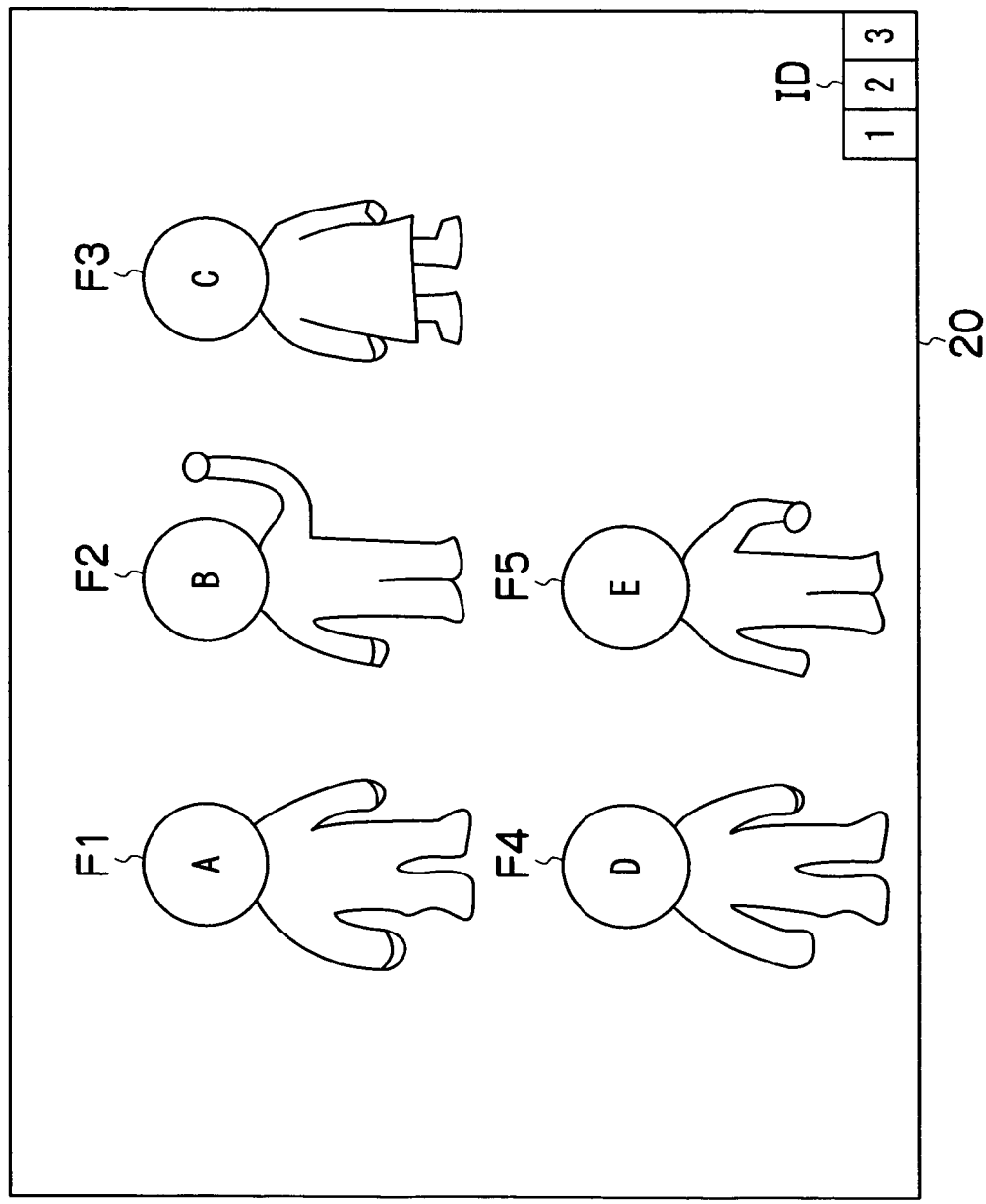
FIG. 14 shows an example of a group photographed together with an ID panel.

FIG. 13 is a block diagram of a photo service system capable of providing a pair of a group photo and a composite photo. In this system, an ID panel is prepared on which a group ID, identification information for identifying a group G uniquely, is displayed. A photo is taken with the group G and the ID panel as the object by a DSC 30 and a silver salt camera 300. Any configuration may be applicable to the ID panel. A plate-shaped wooden or plastic matter with an ID printed, a paper card or a display device for displaying a group ID may be used. The content of the group ID is also not limited, and the name of a group, a number or the date may be included. In the description below, the configuration of this system is assumed to be similar to that of the second embodiment unless otherwise described. An image with a group ID, which has been recorded on a silver salt film 200 by the DSC 30 as shown in FIG. 14, is referred to as a group image for composite. The group image for composite is acquired from the medium acceptance device 130 into the processing section 110 similarly to the second embodiment.

Referring to FIG. 13 again, a printer 210 has a roller which carries the silver salt film 200 wound up into a roll shape, a development processing section which develops the exposed silver salt film 200 and performs fixation/bleaching processing for the developed film, a drier which dries the film processed by the develop processing section, an ink application section which applies ink over the dried film, and a cutter which cuts the film for each image forming area. The printer 210 prints each group image for printing which is recorded on the silver salt film 200, on a recording medium to obtain a group photo 1000.

The group image for printing recorded on the silver salt film 200 by the silver salt camera 300 may be digitized and inputted to the processing section 110 by a scanner 190 and printed by the printer 170. However, it is more preferable to print the group image for printing by the printer 210 directly from the silver salt film 200 to create the group photo 1000 because there is a possibility that the image quality may be deteriorated in the process of digitalization.

The processing section 110 executes an ID recognition section 110a and an ID printing control section 110b stored in the storage section 160 as programs. These programs are read from the storage section 160 and executed by the processing section 110 as required. The ID recognition section 110a recognizes and acquires a group ID stored in a group image for composite. If the ID recognition section 110a cannot recognize the group ID for some reason, a group ID inputted from the operation section 120 is acquired. The ID recognition section 110a may recognize and acquire a group ID recorded on a group image for printing which has been digitized by the scanner 190.

The ID printing control section 110b prints a group ID recognized by the ID recognition section 110a on the surface of a printing medium opposite to the surface where a composite image has been printed by the printer 170 to obtain a composite photo 1010. If the ID recognition section 110a cannot recognize the group ID from a group image for composite for some reason, then a group ID inputted from the operation section 120 is printed on the back of the printing medium.

If a group ID is printed on a printing medium on which a composite image is printed, the group G recorded on the composite photo 1010 can be identified, and the association between the group photo 1000 and the composite photo 1010 can be known by checking the group ID with the ID panel recorded on the group photo 1000 printed by the printer 210. Though it is not required to print a group ID on the back of a printing medium, it is preferable to do so to prevent it from making an obstruction in viewing the composite image.

It is also possible to take a photo of a group together with an ID panel by means of a compound camera configured by the DSC 30 and the silver salt camera 300 which have been integrated, and input an acquired group image for composite and an acquired group image for printing to the processing section 110. The ID printing control section 110b may check a group ID recognized from the group image for composite with a group ID recognized from the digitized group image for printing; associate, based on association between the group image for printing and the group image for composite, the group IDs of which correspond to each other as a result of the checking, a composite image created from the group image for composite and the group image for printing with each other; and print the associated composite image and group image for printing as a pair from the printer 170.

What is claimed is:

1. A photo service system comprising:
a first storage control device which stores, unique admission ticket identification information stored in an IC chip of an admission ticket equipped with IC chip and a registered face image, a face image of a visitor who holds the admission ticket equipped with IC chip, in association with each other, in a first storage medium;
an extraction device which extracts, from an original image taken with a plurality of visitors as objects, extracted face images indicating face portions of the visitors;
a second storage control device which identifies a registered face image matching the extracted face image from the first storage medium, and stores admission ticket identification information corresponding to the identified registered face image, an extracted face image matching the identified registered face image and the original image including the extracted face image matching the identified registered face image in association with each other, in a second storage medium;
a reading device which reads unique admission ticket identification information from the admission ticket equipped with IC chip and identifies the original image stored in said second storage medium associated with said ticket identification information;
a composite device which creates a composite image in which extracted face images extracted from the original image stored in said second storage medium corresponding to the admission ticket identification information read from the admission ticket equipped with IC chip and a predetermined template image are superimposed; and a printing device which prints the composite image;

a determination device which determines composite positions, positions where one or multiple extracted face images extracted from one original image are superimposed on the template image, wherein the composite device superimposes the extracted face images at the determined composite positions; wherein the determination device determines a composite position of an extracted face image corresponding to the admission ticket identification information read from the admission ticket equipped with IC chip to be a particular first composite position, and a composite position of an extracted face image not corresponding to the admission ticket identification information read from the admission ticket equipped with IC chip to be a second composite position other than the first composite position.

2. A photo service system comprising:

an extraction device which extracts a face image of each person from a taken image of a group in which faces of multiple persons are included;

a determination device determines a composite position of an extracted face image corresponding to the admission ticket identification information read from the admission ticket equipped with IC chip to be a particular first composite position, and a composite position of an extracted face image not corresponding to the admission ticket identification information read from the admission ticket equipped with IC chip to be a second composite position other than the first composite position;

a composite device which creates a composite image in which the extracted face images and a template image corresponding to attributes of the group are superimposed; and a printing device which prints the composite image.

3. The photo service system according to claim 2, further comprising:

a storage device which stores group attributes and a template image in association with each other; and a template image identification device which identifies group attributes from a taken group image and identifies a template image corresponding to the identified group attributes from the storage device, wherein the composite device creates a composite image in which the face images and the identified template image are superimposed.

4. The photo service system according to claim 2, further comprising:

a composite position determination device which determines composite positions, positions where the face images and the template image are superimposed, based on attributes of the face images, wherein the composite device superimposes the face images at the determined composite positions.

5. The photo service system according to claim 3, further comprising:

a composite position determination device which determines composite positions, positions where the face images and the template image are superimposed, based on attributes of the face images, wherein the composite device superimposes the face images at the determined composite positions.

6. The photo service system according to of claim 2, further comprising:

an acquisition device which acquires identification information about the group, wherein the printing device prints the acquired group identification information together with the composite image.

7. The photo service system according to claim 3, further comprising:

an acquisition device which acquires identification information about the group, wherein the printing device prints the acquired group identification information together with the composite image.

8. The photo service system according to claim 4, further comprising:

an acquisition device which acquires identification information about the group, wherein the printing device prints the acquired group identification information together with the composite image.

9. The photo service system according to claim 5, further comprising:

an acquisition device which acquires identification information about the group, wherein the printing device prints the acquired group identification information together with the composite image.

10. The photo service system according to claim 7, wherein the printing device prints the group identification information on the back side of a printing surface of the composite image.

11. The photo service system according to claim 8, wherein the printing device prints the group identification information on the back side of a printing surface of the composite image.

12. The photo service system according to claim 9, wherein the printing device prints the group identification information on the back side of a printing surface of the composite image.

13. A photo service system comprising:

a first storage control device which stores unique visitor identification information stored in an IC chip of an admission ticket equipped with IC chip and a registered face image, a face image of a visitor who holds the admission ticket equipped with IC chip, in association with each other, in a first storage medium;

an extraction device which extracts, from an original image taken with a plurality of visitors as objects, an extracted face images indicating face portions of the visitors;

a second storage control device which identifies a registered face image matching the extracted face image from the first storage medium, and stores visitor identification information corresponding to the identified registered face image, an extracted face image matching the identified registered face image and the original image including the extracted face image matching the identified registered face image in association with each other, in a second storage medium;

a reading device which reads unique visitor identification information from the admission ticket equipped with IC chip;

a composite device which creates a composite image in which extracted face images extracted from the original image corresponding to the visitor identification information read from the admission ticket equipped with IC chip and a predetermined template image are superimposed;

a printing device which prints the composite image; and a determination device which determines composite positions, positions where one or multiple extracted face images extracted from one original image are superimposed on the template image, where the composite device superimposes the extracted face images at the determined composite position, wherein the determination device determines a composite position of an extracted face image corresponding to the visitor identification information read from the admission ticket equipped with IC chip to be a particular first composite position, and a composite position of an extracted face image not corresponding to the visitor identification information read from the admission ticket equipped with IC chip to be a second composite position other than the first composite position.

* * * * *